INVENTOR.
DONALD O. HOFFMAN
ATTORNEY

3,698,937
METHOD OF TREATING LENS POLISHING PADS
Donald O. Hoffman, Sturbridge, Mass., assignor to American Optical Corporation, Southbridge, Mass.
Filed Feb. 16, 1971, Ser. No. 115,620
Int. Cl. B32b 27/12; B44d 1/098
U.S. Cl. 117—113                                5 Claims

ABSTRACT OF THE DISCLOSURE

Pads of felt used for polishing lenses and the like are impregnated with an elastomeric fiber bonding material by immersion in a solution of a polyurethane in a chemical solvent to which is added a gelling ingredient to promote homogeneous impregnation of the felt by the polyurethane. Controlled periods of immersion followed by drying and curing cycles which respectively remove solvents and cure the polyurethane in situ complete the process.

BACKGROUND OF THE INVENTION

Field of the invention

Lens polishing pads with particular reference to the treatment of felt pads for use in polishing glass lenses and other hard surfaced articles.

Description of the prior art

In view of the tendency for lens polishing pads of felt to pill or wad up and pull apart during use, it has been the practice to impregnate them with a fiber bonding medium of hot rosin and beeswax. This extends the working life of the pads but adversely brings into being the necessity of dealing with dangerously hot metals of rosin and wax.

Notwithstanding the discouragement of having to engage in the dangerous and messy rosin-wax process, non-uniform evaporation of rosin and wax in heated batches thereof produce corresponding non-uniformities in the rosin-wax constituents of the fiber bonding materials received in felt pads which are successively treated in a continuously heated bath of the rosin and wax. This, in turn, results in non-uniform, non-predictable polishing performances of pads to be treated. Additionally, and nonetheless discouraging, the rosin-wax bond between fibers is essentially non-elastic and fragile having considerably less than optimum resistance to the tendency for felt pad fibers to pull apart during lens polishing.

The present invention overcomes the aforementioned inferiorities of prior art impregnated felt polishing pads by introducing a simple, economical and safe method of treating pads with an elastic fiber-to-fiber bonding material which inhibits pilling and wadding and considerably extends the working life of the pads.

SUMMARY OF THE INVENTION

Objectives of the present invention are accomplished by impregnating felt polishing pads with a polyurethane wherewith elastic fiber-to-fiber bonding is accomplished. This impregnation is effected simply, economically and safely by dissolving the selected polyurethane in a chemical solvent to which a gelling ingredient is added for the purpose of enhancing the uniformity of impregnation upon immersion of the pads therein. Following immersion, all but the polyurethane is removed from the pads with air-drying and heating cycles and the heating cycle is regulated to produce final curing of the polyurethane in situ.

Details of the invention will be more clearly understood by reference to the following description when taken in conjunction with the accompanying drawing.

IN THE DRAWING

DESCRIPTION OF THE PREFERRED EMBODIMENTS

Figure 1:
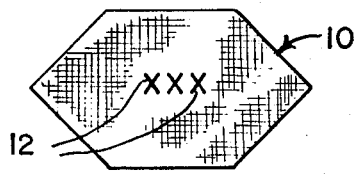
FIG. 1 is a plan view of a felt pad typical of a type intended for treatment according to principles of the present invention.
Figure 2:
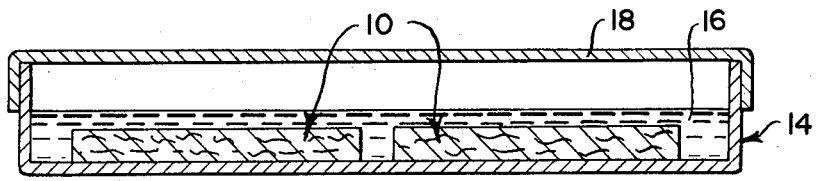
FIGS. 2–5 illustrate various steps in the performance of the method of this invention.

In FIG. 1 there is illustrated a hexagonally contoured felt pad 10 which is typical of a type commonly used for polishing lenses, circular and oval shapes notwithstanding. It being desirable during the processing of felt pads according to the present invention to be able to identify specific sides thereof as their top and bottom, pads 10 are stamped or otherwise marked on one side with indicia 12. Other similarly identifiable markings or different colorings may be used.

Treatment of felt polishing pads according to principles of the present invention is carried out as follows:

A soaking solution is prepared which consists of a premix formed of a preselected polyurethane in a solvent which can be prepared in large quantities (i.e. greater than daily needs) and stored in sealed containers for subsequent use. In its final mix the soaking solution consists of equal quantities by volume of the premix and a gelling ingredient.

Polyurethanes which are useful according to the present inventive concept should possess the following properties:

| | |
|---|---|
| Hardness, Shore "A" | 85 to 95 |
| Tensile modulus: | |
| 100% p.s.i. | 1000 to 1500 |
| 300% p.s.i. | 2000 to 4000 |
| Maximum tensile strength, p.s.i. | 4000 to 5300 |
| Elongation at break, percent | 450 to 400 |
| Elongation at set, percent | 100 to 150 |

Exemplary of such a polyurethane is an elastomer marketed by Uniroyal Chemical a division of Uniroyal, Inc. under the tradename Roylar and referred to in a brochure having Form No. 740–B37 as Roylar A–855–E–2.

preselected powdered or pelletized polyurethane in tetra-

The aforementioned premix is prepared by dissolving a hydrofuran in the proportions of eight grams of polyurethane to 100 cubic centimeters of tetrahydrofuran. Variations in this mixture may range from 2 to 12 grams polyurethane per 100 cc., tetrahydrofuran. Other polyurethane solvents such as dimethylformamide may be substituted for a portion of the tetrahydrofuran.

The final mix which is preferably prepared at the time of treatment of the pads, or only shortly therebefore, is made up of equal proportions of the premix solution and a polyurethane non-solvent gelling agent such as chlorobenzene or a similar gelling agent of a suitable volatile halogenated aromatic compound having a boiling point equal to or somewhat higher than that of the polyurethane solvent. The amounts of premix and gelling agent are selected to be such that the final mix will be of sufficient volume to permit complete immersion of a particular felt pad, or preferably a plurality of pads, placed in a container suitable for such treatment.

Useful ranges in the proportions of the final mix extend from approximately one part of the premix solution to from 0.8 to 2 parts of the polyurethane non-solvent gelling agent.

FIGS. 2–5 illustrate various steps in the process of the present invention wherein the treatment of felt pads is illustrated as being carried out with two pads 10. These two pads are merely exemplary of any preselected reasonable number of pads which may receive the treatment.

Referring more particularly to FIG. 1, the final mix of the soaking solution is placed preferably in a flat pan 14 containing pads 10. The pads are placed in the bottom of the pan with their sides having indicia 12 disposed upwardly. Soaking solution 16 is brought to a level which at least completely covers pads 10 and a tight-fitting cover 18 is placed upon pad 14.

Within a period of time of from two to four hours the solution 16 will gel. Pads 10 are soaked with cover 18 in place for approximately 24 hours. Satisfactory results can be obtained with an immersion time ranging from 12 hours to as long as is desired or convenient. Within this soaking period, the solution 16 gels in situ relatively slowly but uniformly throughout the entire thickness of pads 10 thereby effecting a substantially homogeneous impregnation of its polyurethane constituent into each pad. Gelation produced by the polyurethane non-solvent chlorobenzene of higher boiling point than the polyurethane solvent of tetrahydrofuran serves to hold the polyurethane in place during the subsequent volatilization of the polyurethane solvent whereby the polyurethane is precipitated on the felt fibers prior to removal of the chlorobenzene by evaporation. The intent here is to prevent the polyurethane from following its solvent out of the pads, or migrating to outer surfaces of the pads, during evaporation of the solvent. This is accomplished by the aforementioned gelation effect which would be lost should the polyurethane non-solvent evaporate first.

Following the soaking cycle, pads 10 are removed from container 14, scraped free of excess gel clinging thereto and placed upon a clean smooth surface, e.g. a sheet 20 of polyethylene. The marked sides (i.e. indicia 12) of the pads are directed upwardly and covered temporarily by a second non-porous sheet 22 of polyethylene or the like.

Figure 3:
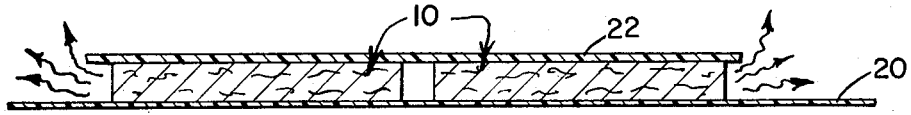
Figure 4:
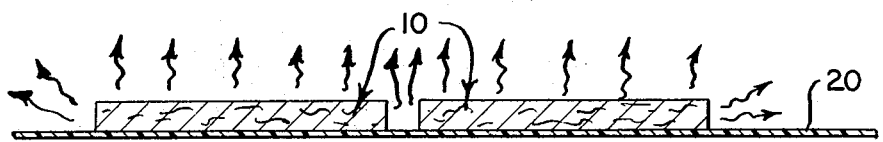
Figure 5:
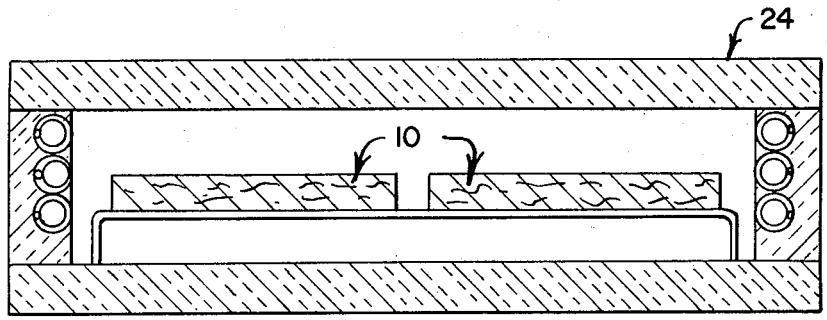

With sheet 22 maintained in place for a few hours, e.g. two or three, slow drying of pads 10 is accomplished with evaporation of solvents therein being permitted escape substantially only through edges of the pads 10 as illustrated by the arrows shown in FIG. 3. By so preventing rapid drying of the pads 10 at this early stage of the drying procedure migration of polyurethane toward outer surface of pads is, in large part, avoided and its homogeneity in the pads is preserved.

Following the foregoing relatively short drying period, cover 22 is removed. With their upper surfaces now also exposed, the pads 10 are permitted to continue drying by evaporation through these surfaces, as well as their edges, as indicated by the arrows in FIG. 4, until the major portion of all volatile matter therein has escaped in a ventilated atmosphere. This drying process is preferably carried out at room temperature for a period of approximately 24 hours wherein it has been found that approximately 98% of the volatile solvents in pads 10 become dissipated. Upon completion of the air-drying cycle, pads 10 are placed marked (i.e. indica 12) sides up in a well ventilated oven 24 of any suitable conventional design and heated from room temperature to a temperature of approximately 250° F. which is held for a period of approximately one to three hours.

The baking cycle finishes drying the pads and cures the polyurethane in situ enhancing the adhesion of the polyurethane to the felt fibers and producing elastomeric fiber-to-fiber bonding. By maintaining the marked sides of all pads 10 in identical orientation throughout all operations and cycles of processing, the migration of soaking solution and its gel into pads 10 and the migration of evaporants out of the pads during drying and curing all proceed in identical directions in corresponding parts of each pad so that the lowermost sides (i.e. opposite to the marked sides) of the pads have substantially identical characteristics of porosity and amounts of cured polyurethane. Thus, the results of using these lowermost sides of the pads in contact with lenses and the like for polishing produces substantially identical results of lens surface texture for given identical cycles, equipment and all other conditions of polishing. Accordingly, when in use, pads 10 are affixed to polishing holders 26 (FIG. 6) with their lowermost sides 28 placed against lens blanks 30 or the like intended to be polished thereby.

Figure 6:
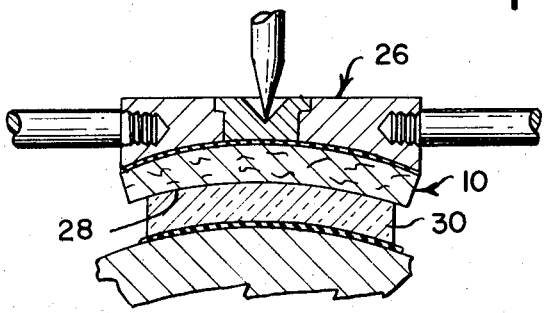
FIG. 6 is a fragmentary cross-sectional view of lens polishing apparatus wherein a polishing pad of the type dealt with herein is illustrated in a position for use.

FIG. 6 is exemplary of one type of polishing apparatus and operation in conjunction with which pads treated according to the present invention may be used to advantage. In such operations it has been found that the surface of a lens formed of crown glass having been fine ground with a tool or abrasive medium of 850 mesh (15 microns) size may be polished with a pad 10 to optical perfection using rouge as a polishing medium within a period of time of approximately 180 minutes. This results in a removal of a thickness of approximately 30 to 40 microns of glass.

I claim:

1. The method of treating pads of felt comprising: submerging the pads in a soaking solution consisting of a polyurethane dissolved in a volatile solvent combined in the proportions of from approximately one part of the polyurethane solvent with 0.8 to 2 parts of a volatile polyurethane non-solvent gelling agent having a higher boiling point than said polyurethane solvent wherein said polyurethane is selected from the group possessing the properties of:

Hardness (Shore "A") _____ 85 to 95
    Tensile modulus:
        100% p.s.i. _____ 1000 to 1500
        300% p.s.i. _____ 2000 to 4000
    Maximum tensile strength, p.s.i. __ 4000 to 5300
    Elongation at break, percent _____ 400 to 450
    Elongation at set, percent _____ 100 to 150 said submergence being continued for a period of time sufficient to effect complete substantially homogeneous impregnation of the pads with said soaking solution;

removing said pads from said soaking solution:

drying said pads in air for a period of time sufficient to dissipate the major portion of said polyurethane solvent and said gelling agent thereby causing precipitation of the polyurethane on fibers of said felt pads; and baking said pads to cure said polyurethane in situ whereby adhesion of said polyurethane to said fibers is enhanced and elastomeric fiber-to-fiber bonding is effected throughout said pads.

2. The method according to claim 1 wherein said soaking solution is formed of a premix consisting of from 2 to 12 grams polyurethane per 100 cc. of said polyurethane solvent.

3. The method according to claim 2 wherein said polyurethane solvent is tetrahydrofuran and said polyurethane non-solvent gelling agent is chlorobenzene.

4. The method according to claim 3 wherein said premix consists of said polyurethane and tetrahydrofuran combined in the proportions of approximately 8 grams polyurethane to 100 cc. tetrahydrofuran and said final mix consists of approximately equal proportions of said chlorobenzene and said premix.

5. The method according to claim 1 wherein said pads are soaked in said solution for a minimum time of approximately twelve hours, dried over a period of time of approximately 24 hours following removal from said solution, and baked at a temperature of approximately 250° F. for a period of from 1 to 3 hours.

References Cited
UNITED STATES PATENTS

| | | | |
|---|---|---|---|
| 3,553,008 | 1/1971 | Reishl et al. | 117—140 X |
| 3,551,364 | 12/1970 | McGarr | 260—2.5 |
| 3,492,154 | 1/1970 | Einstman | 117—119.4 |
| 3,575,894 | 4/1971 | Zorn et al. | 260—2.5 |
| 3,539,388 | 11/1970 | Shu-Tung Tu | 117—161 |
| 3,565,982 | 2/1971 | Day | 260—2.5 X |
| 3,491,053 | 1/1970 | Sommer et al. | 117—161 |

WILLIAM D. MARTIN, Primary Examiner

H. J. GWINNELL, Assistant Examiner

U.S. Cl. X.R.

51—295; 117—140 A, 161 KP